United States Patent [19]

Bullock et al.

[11] Patent Number: 5,219,676
[45] Date of Patent: Jun. 15, 1993

[54] EXTENDED SHELF-LIFE BATTERY

[75] Inventors: Norma K. Bullock, Pewaukee; James S. Symanski, Grafton, both of Wis.

[73] Assignee: Globe-Union, Inc., Milwaukee, Wis.

[21] Appl. No.: 675,748

[22] Filed: Mar. 27, 1991

[51] Int. Cl.[5] .............................. H01M 6/04
[52] U.S. Cl. ..................... 429/48; 206/204;
206/333; 429/49; 429/57; 429/126; 429/204
[58] Field of Search ............ 429/57, 48, 49, 204, 429/126

[56] References Cited

U.S. PATENT DOCUMENTS

| 3,067,275 | 12/1962 | Solomon . | |
|---|---|---|---|
| 3,530,002 | 9/1970 | Little . | |
| 3,556,860 | 1/1971 | Amlie . | |
| 3,586,539 | 6/1971 | Lauck . | |
| 3,591,422 | 7/1971 | Bernholtz et al. | 429/204 |
| 3,652,341 | 3/1972 | Halsall et al. . | |
| 3,776,779 | 12/1973 | Johnson | 429/204 |
| 3,928,066 | 12/1975 | Lewenstein | 429/204 |
| 3,930,881 | 1/1976 | Cestaro et al. | 429/204 |
| 3,948,680 | 4/1976 | Mao et al. . | |
| 3,988,165 | 10/1976 | Mao et al. . | |
| 4,098,961 | 7/1978 | Sabatino | 429/48 |
| 4,200,683 | 4/1980 | Bant | 429/204 |
| 4,414,302 | 11/1983 | Jache et al. | 429/204 |
| 4,448,860 | 5/1984 | Von Alpen et al. | 429/57 |
| 4,629,622 | 12/1986 | Yonezu et al. | 429/57 |
| 4,863,816 | 9/1989 | Misra et al. | 429/204 |
| 5,035,966 | 7/1991 | Tokunaga et al. | 429/204 |
| 5,114,806 | 5/1992 | Chiacchio et al. | 429/126 |
| 5,116,697 | 5/1992 | Fleischmann et al. | 429/126 |

FOREIGN PATENT DOCUMENTS

| 1828 | 1/1979 | Japan | 429/57 |
|---|---|---|---|
| 105266 | 6/1984 | Japan | 429/204 |

OTHER PUBLICATIONS

Storage Batteries, G. Vinal, Sc.D., 4th Ed., p. 41 (date unavailable).
Lead-Acid Batteries, H. Bode, pp. 277-279 (date unavailable).
Journal of the Electrochemical Society, vol. 129, No. 7, Bullock, et al., pp. 1393-1398 (Jul. 1982).

Primary Examiner—Wayne Langel
Attorney, Agent, or Firm—Foley & Lardner

[57] ABSTRACT

The present invention provides a method for maintaining the specific gravity of acid in a lead-acid battery within a predetermined range to prevent undesirable plate degradation and gassing during storage. Extended shelf-life is accomplished by employing a battery which is formed to the desired voltage and which is stored in a damp condition with the electrolyte maintained in a range which, in the most preferred embodiment, is between about 1.015 and 1.320. A desiccant, for example a gelled sulfuric acid desiccant, is placed in the battery housing, out of contact with the plates, to absorb the water vapor which is generated by the self-discharge reactions. The amount of desiccant is selected so that all the water vapor formed during such reactions is removed to maintain the specific gravity of the electrolyte in said range. Extended shelf-life results, and the desiccant can be used to form the battery electrolyte at the time it is desired to place the battery in service.

18 Claims, 4 Drawing Sheets

EXTENDED SHELF-LIFE BATTERY

BACKGROUND OF THE INVENTION

1. Field of the Invention

The present invention relates generally to the art of lead-acid batteries, and more particularly to processes for producing batteries having extended shelf-life and to the batteries produced by such processes. The invention also relates in its most preferred embodiment to the use of a gelled desiccant contained within a battery housing to maintain the specific gravity of the electrolyte of a dampened, formed, battery within a predetermined specific gravity range. In the most preferred embodiment, the desiccant and absorbed water is later used to form the reconstitution electrolyte for the battery.

2. Description of the Prior Art

Attempts have been made for many years to improve the storage life of lead-acid batteries. Using the easiest example for explanation, it would be highly desirable to be able to manufacture batteries for distribution through the automobile aftermarket, which batteries would be stable over long periods of time, e.g., 2-4 years. Such batteries would make inventory control easier for those involved in the distribution system, and long shelf-life would be especially beneficial if little or no additional charge would be required at the time the battery is placed into service.

While such efforts have taken place, two principal types of systems have been developed, one by the assignee of the present invention, known as the damp storage system. In this battery production technique, the battery is prepared in the normal fashion and formed to the desired voltage with wet plates and separators. The acid is then dumped and removed in a spin process, so that only a residual quantity of electrolyte is maintained. While the process has achieved some success, the storage life is not as long as desired. Damp batteries are activated by the addition of acid, and typically a charge is provided by the installer of the battery to bring the battery back to its desired voltage. See, U.S. Pat. No. 3,652,341 issued Mar. 28, 1972 to Halsall, et al.; U.S. Pat. No. 3,948,680 issued Apr. 6, 1976 to Mao, et al.; and U.S. Pat. No. 3,988,165 issued Oct. 26, 1976 to Mao, et al.

A dry charge technique has also been developed, in which charged plates and separators are prepared outside of the battery housing and are placed into the housing in a dry condition. These batteries have a somewhat longer shelf-life than the damp variety and are also acid activated. See, G. Vinal, *Storage Batteries*, 4th Ed., John Wiley & Sons, Inc., New York, 1955, p. 41, and H. Bode, *Lead-Acid Batteries*, John Wiley & Sons, Inc., New York, 1977, pp. 277–279. While dry-charged batteries probably offer the longer shelf life, their production requires extra processing involving large quantities of water. This water must be treated before it can be released into the municipal sewer system. The cost of this treatment and the resultant environmental concerns tend to make the dry-charge system undesirable.

The reasons why long shelf-life lead-acid batteries have been difficult to prepare relate to the complex electrochemistry of such systems and the battery self-discharge reactions which were first reported in the late 19th Century. Since that time, the reactions which are known to limit the shelf-life in lead-acid batteries have been well defined and are listed below:

At the positive electrode, they are
Oxygen evolution:

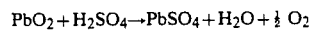

$$PbO_2 + H_2SO_4 \rightarrow PbSO_4 + H_2O + \tfrac{1}{2} O_2 \qquad [1]$$

Hydrogen recombination:

$$PbO_2 + H_2 + H_2SO_4 + \rightarrow PbSO_4 + 2H_2 \qquad [2]$$

Oxidation of organic contaminants:

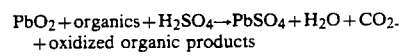

$$PbO_2 + organics + H_2SO_4 \rightarrow PbSO_4 + H_2O + CO_2 \qquad [3]$$
$$+ oxidized\ organic\ products$$

Grid corrosion:

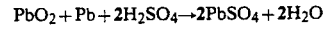

$$PbO_2 + Pb + 2H_2SO_4 \rightarrow 2PbSO_4 + 2H_2O \qquad [4]$$

[A variety of other corrosion reactions can occur as well.]

Oxidation of grid alloying metals, such as antimony:

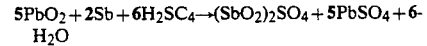

$$5PbO_2 + 2Sb + 6H_2SC_4 \rightarrow (SbO_2)_2SO_4 + 5PbSO_4 + 6H_2O \qquad [5]$$

(Similar reactions can be written for other metals.)
Sulfation of "apparent PbO":

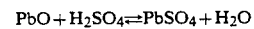

$$PbO + H_2SO_4 \rightleftharpoons PbSO_4 + H_2O \qquad [6]$$

At the negative electrode, two more reactions can occur
Hydrogen evolution:

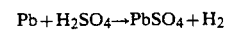

$$Pb + H_2SO_4 \rightarrow PbSO_4 + H_2 \qquad [7]$$

Oxygen recombination:

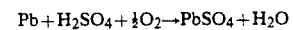

$$Pb + H_2SO_4 + \tfrac{1}{2}O_2 \rightarrow PbSO_4 + H_2O \qquad [8]$$

These various reactions, and their effect on acid-starved lead-acid batteries, are discussed in detail in the 1982 article of Bullock, et al. printed in Volume 129, No. 7, Jul., 1982 issue of The Journal of *Electrochemical Society*, pages 1393–1398. A copy of this article is provided with the specification.

As pointed out in the Bullock, et al. article, which of the many reactions will dominate at any particular time depends upon a number of factors, including the design of the battery and the materials used. Moreover, a relationship is noted between the concentration of the acid and time and temperature. It is noted that acidstarved batteries, such as those prepared using the damp storage system, demonstrate a relatively predictable decline in open-circuit voltage over time, and a change in the slope of the curve indicates changes in reactions which occur depending upon the rate of grid corrosion and gas evolution It is a further understanding of these reactions and the discovery by the present inventors of a technique for controlling the reactions which form the basis for the present invention.

Another item of prior art which should be discussed in the context of the present invention is a patent owned by the assignee of the present invention, i.e., U.S. Pat. No. 3,556,860 issued Jan. 19, 1971 to Amlie for "Storage Battery and Electrolyte Precursor Therefor". In this patent, the patentee suggests the use of a gelled sulfuric acid composition for forming a battery electrolyte to be used in combination with dry charge batteries for the on-the-site preparation of ready-to-use lead-acid batteries. The preferred gelled sulfuric acids described in this application are those which include oxides of boron and phosphorous together with sulfuric acid. While one of the patent drawings is used to define the range of acids covered by the claims of the Amlie patent, one example thereof is a gel having a molar ratio of 1.4 $H_3PO_4$/4.0 $H_3BO_3$/100.0 $H_2SO_4$. That particular material, prepared by mixing boric acid, phosphoric acid and sulfuric acid, resulted in a firm gel after about 10 hours at 80° C. (see Example 1 of the patent).

The gel prepared by Amlie was contained in a bag, which the patent indicates has no particular structure since the gelled sulfuric acid has sufficient rigidity to retain its slab-like shape. Perforations were provided to permit the ready escape of the electrolyte when the gel was later mixed with water. The Amlie gel did not perform any type of desiccant function, since it was employed with dry-charged systems as described earlier.

Other patents have disclosed the use of gelled acids for dry charge batteries which are mixed with water at the time of use. See, for example, Solomon U.S. Pat. No. 3,067,275, issued Dec. 4, 1962 for "Storage Battery Electrolyte"; Little U.S. Pat. No. 3,530,002 issued Sep. 22, 1970 for "Water-Activated, Dry Charge Lead-Acid Storage Battery Utilizing Gelled Sulfuric Acid Electrolyte Precursor and Method of Activating Same"; and Lauck U.S. Pat. No. 3,586,539 issued Jun. 22, 1971 for "Lead Accumulator With Dry Storage Stable Charged Electrode Plates". Each of the foregoing patents indicates that the gelled material is used to maintain the dry charge state and does not teach or suggest the use of a gelled desiccant for control of the specific gravity of an electrolyte in a damp system or prolonging shelf-life by water removal therefrom. The increase of battery shelf-life using a material which is subsequently incorporated into the battery system would represent a significant advance in this technology.

SUMMARY OF THE INVENTION

A feature of the present invention is a battery system of the damp plate variety having substantially extended shelf-life, in which desirable battery voltage is maintained for periods substantially exceeding those of prior art systems Another feature of the invention is the prevention of degradation of the positive and the negative electrode plates within the battery system, as well as the reduction of gassing at plate surfaces.

Another feature of the invention is a battery system which maintains its voltage over extended storage periods at room temperature, as well as at elevated storage temperatures. A further feature of the invention is the use of a desiccant system within a battery, which desiccant includes an acid material which is later used at the time the battery is placed into service for all or at least part of the battery electrolyte.

How these features are provided in a battery system will be described in the following detailed description of the preferred embodiment of the invention, taken in conjunction with the drawings. Generally, however, they are accomplished by providing a damp battery system in which the positive and negative electrode plates and separators are prepared in a conventional fashion and are charged wl le immersed in electrolyte. The electrolyte, typically sulfuric acid, is dumped from the battery, leaving a charged battery in a damp condition. A quantity of desiccant material, preferably a gelled desiccant including sulfuric acid is located in the head space of the battery, or any other location within the battery housing not in contact with the battery plates. Still more specifically in the preferred embodiment, a desiccant including sulfuric acid as well as the oxides of boron and phosphorus is employed. Containment of the desiccant is most preferably provided by a thin plastic film which will allow water vapor transfer to the desiccant from the remainder of the battery housing, and in one embodiment, the desiccant containment includes a "window" of a relatively more water vapor pervious material such as a polytetrafluoroethylene (Gortex ®).

The features of the invention are also made possible by controlling the specific gravity of the electrolyte which remains within the battery compartment after formation to between about 1.015 and 1.320 and selecting an appropriate amount of desiccant to maintain the specific gravity within that range as water is produced during the normal self-discharge reactions. Gassing at the negative electrode is prevented using the teachings of the present invention, and deterioration of the positive electrode through the process of sulfation and grid corrosion are also substantially reduced. At the time it is desired to place the battery in service, the desiccant bag can be ruptured and mixed with water or dilute acid to produce the desired final electrolyte concentration.

Other ways in which the features of the invention are accomplished will become apparent to those skilled in the art after reading the following detailed description. The scope of the invention is, accordingly, not to be limited by the description or the foregoing comments, but is to be limited solely by the scope of the claims which follow.

DETAILED DESCRIPTION OF THE PREFERRED EMBODIMENT

Before proceeding to the detailed description of the preferred embodiment of the present invention, several general comments need to be made about the applicability and adaptability of the present invention to various types and sizes of batteries. While a typical 6 cell, 12- volt automobile battery will be used as an example in the following description, the principles of the invention are adaptable to batteries of larger or smaller sizes and containing more or less cells. Generally, the present invention is applicable to any battery system wherein water is generated during self-discharge and where a relationship exists between the acid concentration and the reaction kinetics (including, for example, bipolar, tubular or Plante plate systems).

It is envisioned that by controlling the rate of water absorption, a near constant cell voltage may be obtained in a range where excessive gassing and grid corrosion are minimized. As discharge continues, a "dry charged" state will gradually be approached, with the water being absorbed by the gel and the sulfuric acid being incorporated in the plates as lead sulfate.

Our experimental work has indicated that at cell potentials above about 2.05 $^v$/cell, the negative electrodes are likely to evolve hydrogen while at potentials below about 1.850 $^v$/cell positive grid corrosion will proceed at an appreciable rate. The specific cell voltage limits for a given battery will depend largely on design of construction and the selection of alloys for the system. Between these potentials, the double sulfate reaction occurs, wherein the consumption of one mole of sulfuric acid results in the formation of one mole of water. The present invention contemplates the use of a gelled desiccant to remove water from the acid electrolyte as it forms during self-discharge to maintain the cell voltage between the aforementioned ranges by controlling acid specific gravity.

The preferred desiccant for the present invention is the $H_3PC_4/H_3BO_3/H_2SO_4$ gel described in the aforementioned Amlie patent. Its use in the present invention, however, is in damp batteries, as opposed to the dry charge systems referred to in that patent.

Figure 1:
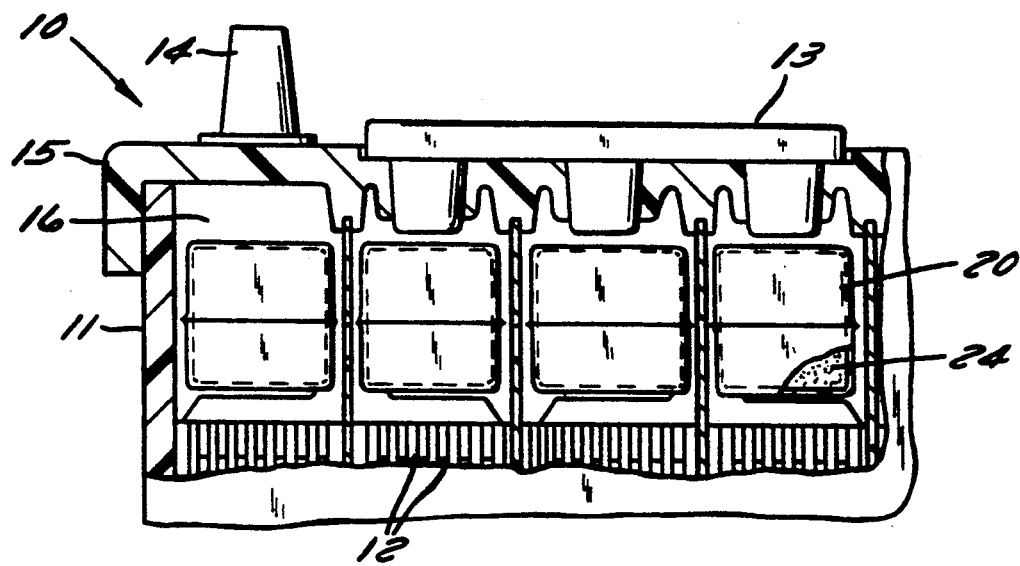
FIG. 1 is a partial end view, partially in section, of a conventional battery, such as an automobile battery, showing the location of a desiccant bag in the head space of the battery system.

An end view of an illustrative battery 10 is shown in FIG. 1 to consist of a housing 11 typically formed of a plastic material resistant to sulfuric acid, such as polyethylene, polypropylene, or the like. Container 11 includes a plurality of plates 12 below one-way relief vent caps 13, a terminal 14 being shown at the left side of the drawing. The caps 13 and terminal are part of cover 15, the latter being spaced from the top of the plates by a headspace 16. The vent caps 13 must prevent the ingress of oxygen or moisture and permit the egress of gases if excessive pressure builds up in the head space during storage. Such vents are well-known and, in and of themselves, form no part of the present invention. After activation, the vent caps 13 would be replaced by neutral vents traditionally used in battery manufacture. All of these battery components are well-known and will not be described in detail. Furthermore, the plates, separators, terminal connectors, intercell connectors explosion attenuation devices and the like which are employed in modern batteries are not shown because in and of themselves they do not form part of the present invention. All that is necessary is that the headspace, or for that matter, some space within the battery which is out of contact with the plates but which is exposed to the water vapor atmosphere within container 11, be large enough to contain a quantity of desiccant. A bag 20 is used to contain the desiccant in the illustrated embodiment.

Figure 2:
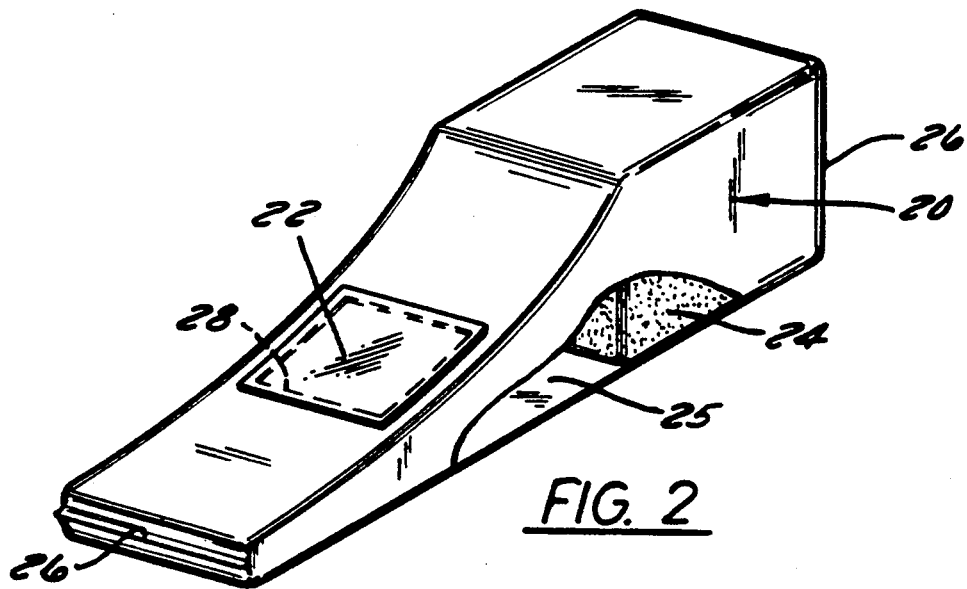
FIG. 2 is a schematic illustration of a desiccant bag including a "window" of a relatively more porous material for water vapor created by the self-discharge reactions.

Proceeding now to a description of FIG. 2, the bag 20 of gelled desiccant is shown in greater detail including a window of PTFE 22. Bag 20 is preferably a polyethylene bag, but it could be made from other materials which possess the required properties of resistance to the gel material and sufficient permeability for the water vapor. The latter property would not be necessary in all cases, e.g. where sufficient permeability is provided by one or more windows 22. Moreover, the bag could be replaced by a cavity or recess in the battery, covered by a window to permit water vapor to reach the desiccant.

The desiccant 24 is shown within bag 20 as a gel at one end of the bag, with sufficient additional space 25 being provided in bag 20 to accommodate the growth caused by water absorption. One example of the magnitude of such growth is provided below in the working examples. The ends 26 of bag 20 are sealed by any suitable means, such as a heat seal of the thermoplastic resin. It is also noted in this FIGURE that the bag 20 includes a cut out portion 28 having dimensions slightly less than those of the window 22, and in the preferred embodiment the window 22 is applied to bag 20 by heat sealing. Adhesives could be used, as could other attachment techniques. See Example 3 for more details about the window 22.

The preferred desiccant 24 is that described in the aforementioned Amlie patent. More specifically, we have found a gel having the following molar ratio to be particularly suitable: $2H_3PC_4/5H_3BO_3/100H_2SO_4$. The amount of the gel will vary from battery size to battery size within the guidelines of being a sufficient quantity to absorb all water vapor produced during the self-discharge reactions. For normal 12V automobile batteries having six cells, the amount could range between about 50 grams to 300 grams. One skilled in the art could readily select a desiccant quantity by knowing the battery size, plate construction and volume of electrolyte left in the battery after the dumping step.

Upon completion of the storage period for a battery made according to the present invention, the bag 20 would normally be used as the source of all or at least part of the reconstitution electrolyte, as has previously been suggested for the Amlie desiccant in the dry storage battery systems. Adjustment of the final electrolyte concentration could be made with water or dilute acid, following procedures which are well known. Simply puncturing the bag to allow the liquified gel (due to water absorption) to flow into the battery cells should suffice in most cases, and leaving the emptied bag in the battery housing 12 will not interfere with desired battery operation. Optionally, the bag 20 could be removed at the time of battery activation, and the liquified gel dumped therefrom into a suitable container. Following suitable adjustment of the acid concentration, the electrolyte would then be poured into housing 12 through, e.g. a vent cap opening. The present invention is further illustrated in the following examples.

EXAMPLE 1

Figure 3A:
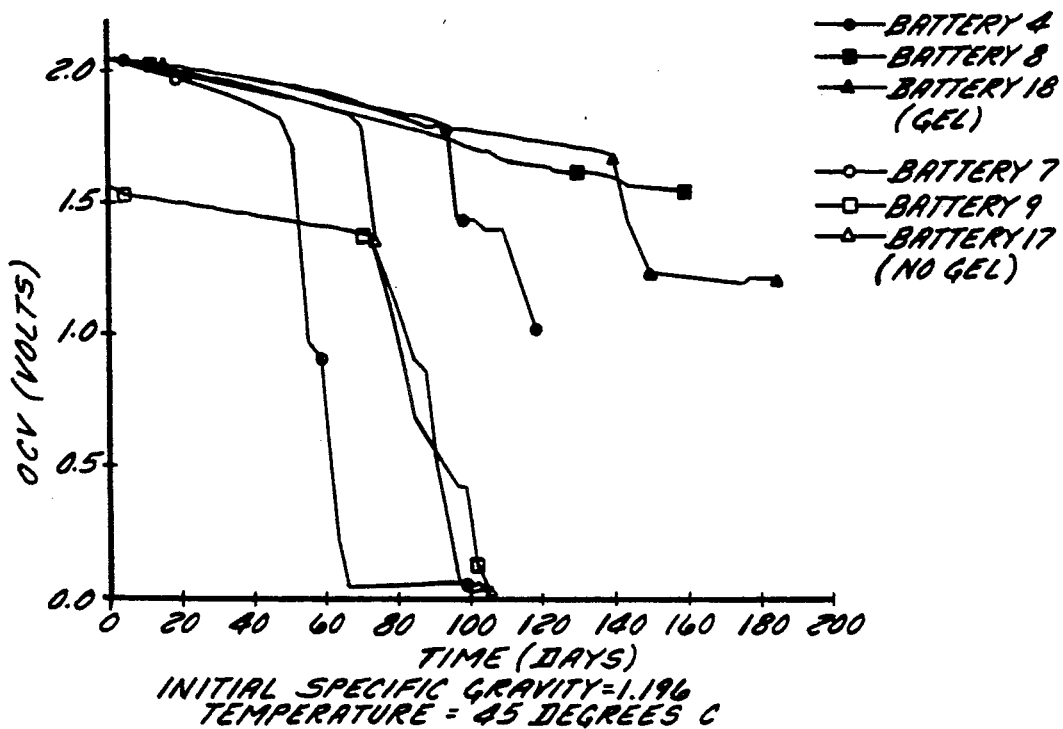
FIG. 3A is a graph showing a plot of voltage versus time at 45° C. for batteries prepared according to the present invention and those prepared using prior art damp battery systems.
Figure 3B:
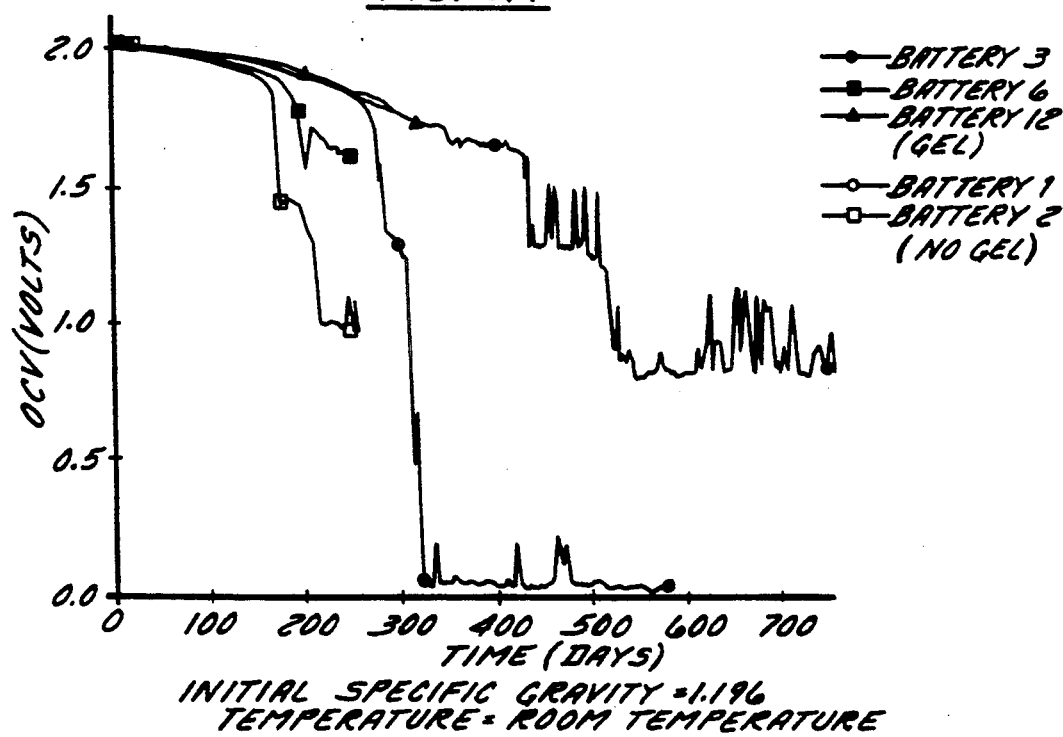
FIG. 3B is a graph of voltage versus time, similar to FIG. 3A but showing testing conducted at room temperature.

Eleven six-cell, 12V batteries were formed in a conventional manner and were equilibrated in 1.196 specific gravity sulfuric acid. The electrolyte was dumped from each battery (leaving about 20% of the original electrolyte volume) and in six of the test batteries a gelled desiccant was placed above the cell stack. The gel (58 grams) was placed in a polyethylene (0.0006" thick) bag to prevent its being mixed with the battery electrolyte. The other five batteries were covered and sealed, without a desiccant. FIG. 3A shows the open circuit voltages of these batteries (shown as average cell voltage) stored at 45° C., while FIG. 3B shows the comparison at room temperature. The data indicates that the batteries which included the desiccant maintained a higher cell voltage for a longer time than those without the desiccant.

At the time of activation of one of the desiccant batteries, a bag was removed from the cell of the battery and its weight was compared to the original. It was noted that the mass had increased 53.7 grams in the 257 days of the testing.

EXAMPLE 2

Figure 4A:
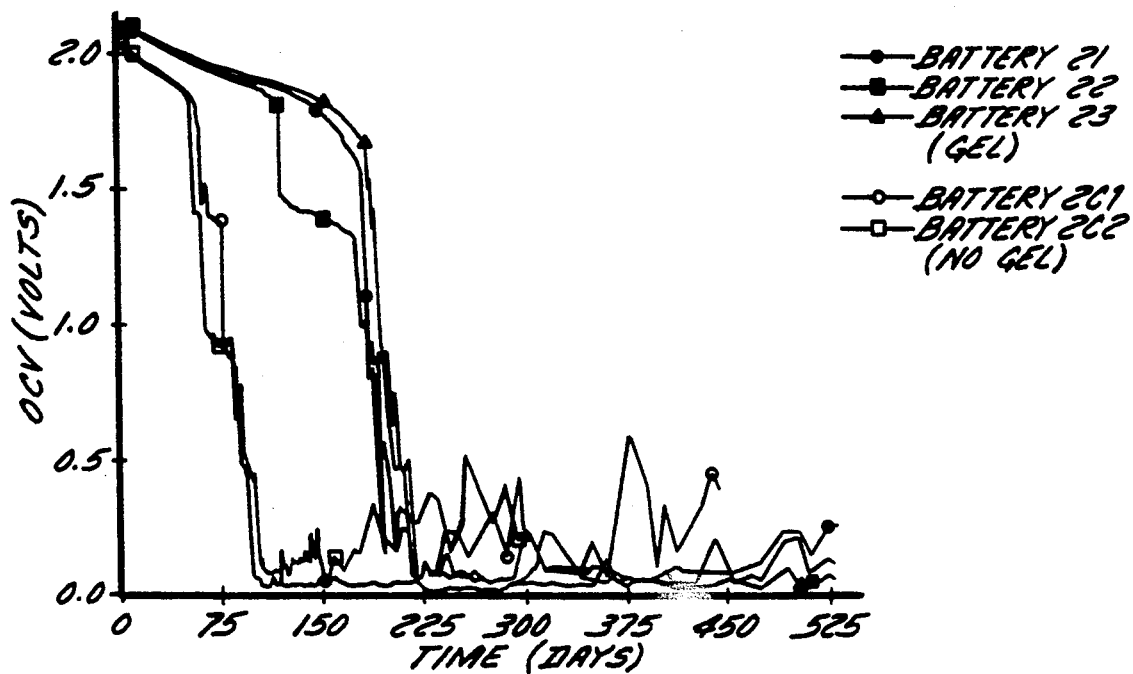
FIG. 4A is a graph of voltage versus time at 45° C., showing a desiccant bag system according to the present invention including the more porous "window"
Figure 4B:
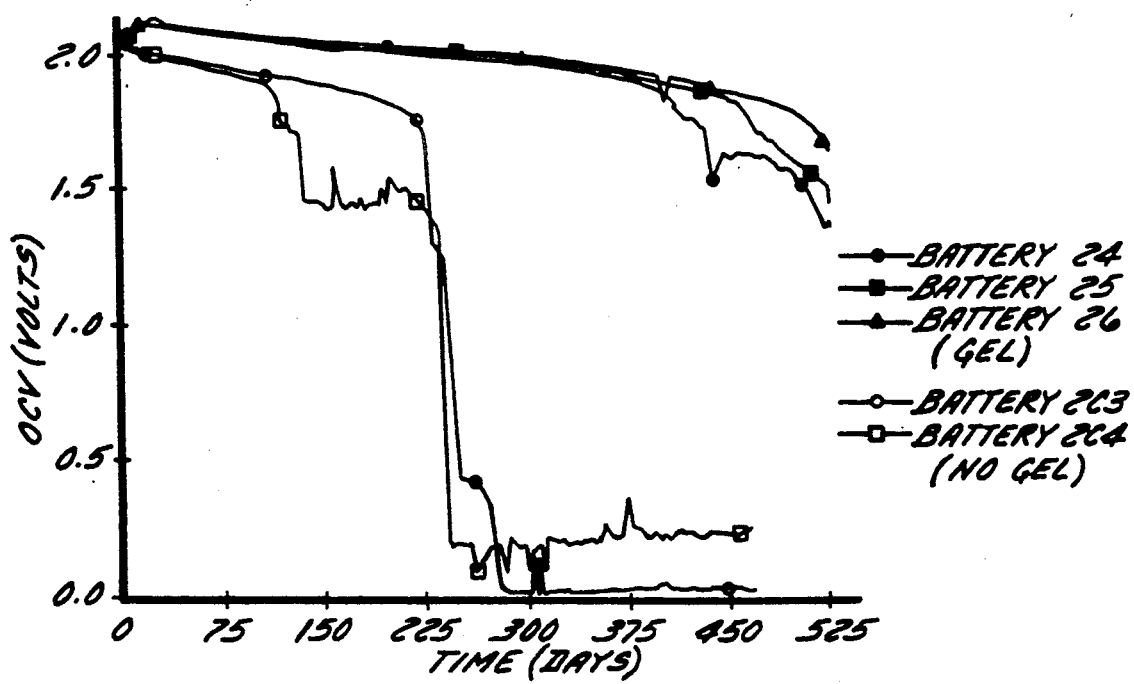
FIG. 4B is a graph of voltage versus time utilizing the "window" for the desiccant bag with the testing being conducted at room temperature.

A second group of ten batteries were prepared as in Example 1 and were placed on the test stand. Six of the batteries were equipped with the desiccant, except that the polyethylene bag used in Example 1 was modified in an effort to accelerate the rate of water vapor transfer to the desiccant. A small window of a porous polytetrafluoroethylene (PTFE) was incorporated into one face of the bag (see later description of FIG. 2), in this case a 1"×2" patch of Gortex ® (W.L. Gore & Associates, Inc., Elkton, Maryland, part number L 31083). The bag was cut out below the patch, and the patch was heat sealed around the bag opening. FIG. 4A illustrates the average cell voltages of these batteries at 45° C., while FIG. 4B shows the results when the batteries were stored at room temperature. The data readily indicate that the presence of the gas porous window has markedly accelerated the rate of water vapor transport, as indicated most notably by the initial rise of voltage and the slower rate of voltage decline for the batteries which included the desiccant.

EXAMPLE 3

Figure 5A:
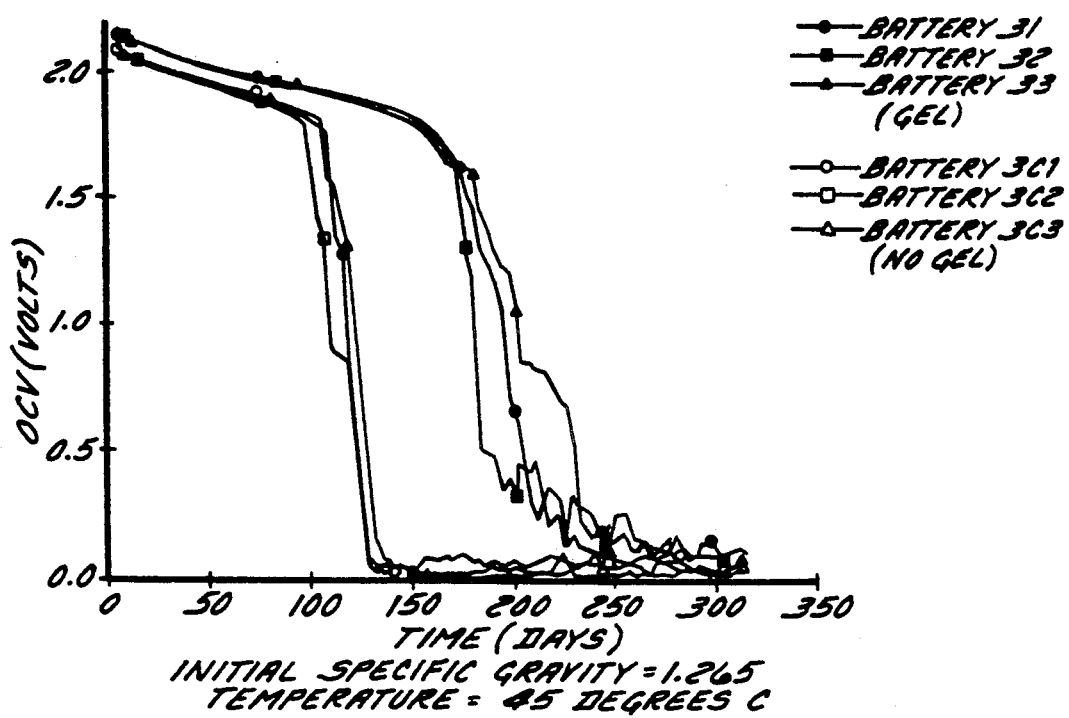
FIG. 5A is a graph of voltage versus time for a system similar to that shown in FIG. 4A except with a starting acid specific gravity of 1.265 with testing carried out at 45° C.
Figure 5B:
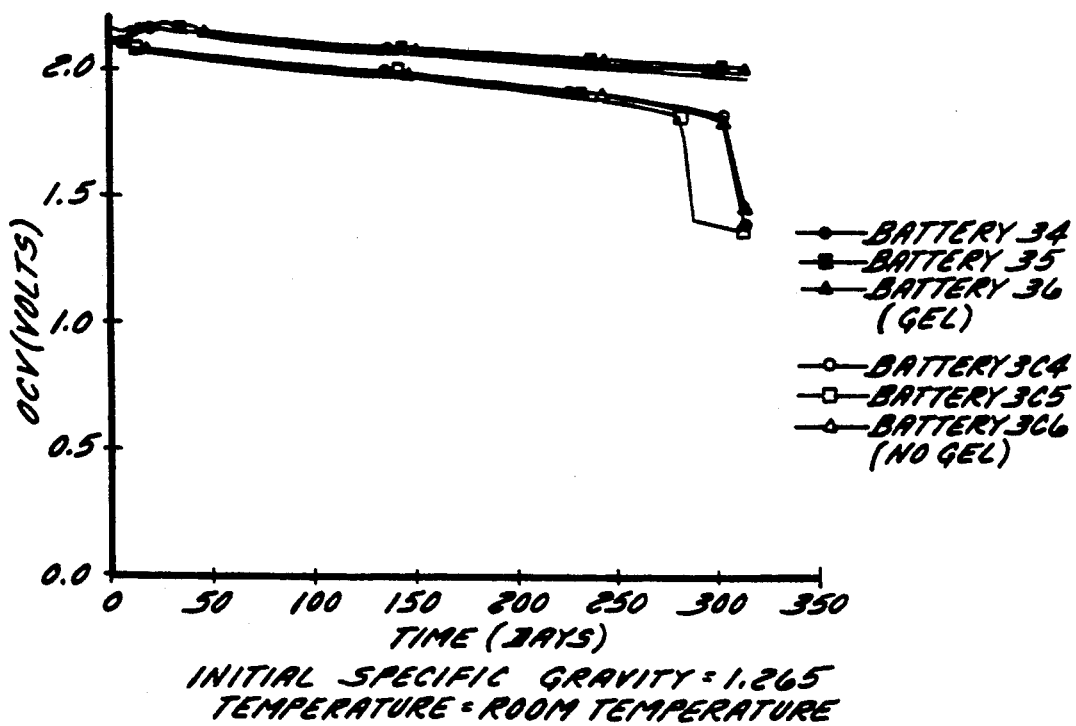
FIG. 5B is a graph similar to FIG. 5A except that the testing was carried out at 25° C.

Example 2 was repeated except that the initial specific gravity was 1.265. At the higher initial concentration, the gelled desiccant also demonstrated its ability to rapidly absorb water vapor and lower the rate of cell voltage decline. See FIGS. 5A and 5B showing test data for batteries stored at 45° C. and room temperature, respectively.

While several examples have been provided above, the present invention is not to be limited thereby but is to be limited solely by the scope of the claims which follow.

What is claimed is:

1. A lead-acid battery having extended shelf-life comprising:
   a battery housing containing positive and negative lead-acid electrode elements and separators;
   sulfuric acid electrolyte contained within the housing in a quantity sufficient to maintain the electrode elements in a damp, but not flooded, condition;
   a desiccant within the housing located out of contact with the elements and in a position to absorb water vapor present in the housing the desiccant being located in a container at least a portion of water is permeable to water vapor;
   the electrode positive and negative materials being formed so that a charge exists on the battery and so that self-discharge reactions will occur within the housing producing water vapor;
   the electrolyte having a specific gravity ranging from about 1.015 to about 1.320 and the quantity of the desiccant being sufficient to absorb the water vapor created during the self-discharge reactions to maintain the specific gravity of the electrolyte within said range.

2. The battery of claim 1, wherein the desiccant is a gelled desiccant.

3. The battery of claim 2, wherein said gelled desiccant comprises a gel formed from sulfuric acid and the oxides of boron and phosphorus.

4. The battery of claim 2, wherein the gelled desiccant is contained within a flexible polymeric bag, said bag being constructed from a first polymer material which permits permeation of water vapor therethrough.

5. The battery of claim 1, wherein the desiccant is contained within a flexible bag made from a first polymeric material, a portion of said bag being constructed from a second polymeric material which is permeable to water vapor.

6. The battery of claim 4, wherein a portion of said bag is constructed from a second polymeric material which is relatively more permeable to water vapor than the first polymeric material.

7. The battery of claim 5, wherein said second polymeric material is polytetrafluoroethylene.

8. The battery of claim 1, wherein the desiccant is provided in sufficient quantity to provide a flooding quantity of electrolyte for said battery when mixed with a fluid.

9. A method for extending the storage life of a lead-acid battery comprising the steps of:
   preparing a formed, lead-acid battery including electrode elements and a flooding quantity of sulfuric acid electrolyte;
   removing from said battery a substantial quantity of the electrolyte to leave damp elements;
   placing in the battery a quantity of desiccant in a container, at least a portion of which is permeable to water vapor, the container being in a position to absorb water vapor generated in the battery during self-discharge and at a location out of contact with the electrode elements; and
   controlling the specific gravity of the electrolyte remaining in said battery after said removal step within a range of about 1.015 and 1.320 during discharge reactions by absorbing water vapor produced thereby in the desiccant.

10. The method of claim 9 wherein the desiccant is a gelled desiccant.

11. The method of claim 10 wherein the gelled desiccant comprises a gel formed from sulfuric acid and the oxides of boron and phosphorous.

12. The method of claim 9 wherein said desiccant is contained within a flexible polymeric bag, said bag being constructed of a first polymer material which permits absorption of water vapor therethrough.

13. The method of claim 11, wherein a portion of said bag is made from a second polymeric material which is relatively more permeable to water vapor than the first polymeric material.

14. The method of claim 13, wherein said second polymeric material is polytetrafluoroethylene.

15. The method of claim 9, wherein the desiccant is contained within a flexible bag made from a first polymeric material, a portion of said bag being constructed from a second polymeric material which is permeable to water vapor.

16. The method of claim 9 comprising the further step of adding a liquid to the battery after storage and mixing the desiccant and any absorbed water vapor therewith to create at least a portion of the electrolyte required for battery operation.

17. An extended storage-life, lead-acid battery which includes battery elements comprising positive and negative electrode elements and separators therebetween which have been formed and from which battery most of the electrolyte present during formation has been removed to leave damp elements, the improvement comprising:

placing a quantity of gelled desiccant within said battery and out of contact with the elements thereof, the desiccant being a gelled desiccant made from sulfuric acid and wherein the desiccant is contained in a container, at least a portion of which is permeable to water vapor; and the electrolyte remaining in the battery having a specific gravity ranging from about 1.015 to about 1.320.

18. The battery of claim 17 wherein the container is a plyethylene bag having an opening cut therein, said opening being covered by a film of polytetrafluorethylene.

* * * * *